United States Patent
Yang et al.

(10) Patent No.: US 11,412,078 B2
(45) Date of Patent: Aug. 9, 2022

(54) DATA TRANSMISSION METHOD AND FIRST DEVICE

(71) Applicant: Huawei Technologies Co., Ltd., Shenzhen (CN)

(72) Inventors: Hua Yang, Shenzhen (CN); Chunzhi He, Shenzhen (CN); Lei Cui, Shenzhen (CN); Dexian Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 16/909,414

(22) Filed: Jun. 23, 2020

(65) Prior Publication Data
US 2020/0322466 A1 Oct. 8, 2020

Related U.S. Application Data

(63) Continuation of application No. PCT/CN2018/124384, filed on Dec. 27, 2018.

(30) Foreign Application Priority Data

Dec. 27, 2017 (CN) .......................... 201711448880.9

(51) Int. Cl.
*H04L 29/08* (2006.01)
*H04L 69/324* (2022.01)
(Continued)

(52) U.S. Cl.
CPC ........ *H04L 69/324* (2013.01); *G06F 12/1081* (2013.01); *H04L 1/08* (2013.01);
(Continued)

(58) Field of Classification Search
CPC ....... H04L 69/324; H04L 1/08; H04L 1/1614; H04L 12/4633; H04L 47/2466; H04L 2212/00; G06F 12/1081
(Continued)

(56) References Cited

U.S. PATENT DOCUMENTS

2008/0002578 A1* 1/2008 Coffman ............... H04L 47/193
370/230
2015/0039712 A1 2/2015 Frank et al.
(Continued)

FOREIGN PATENT DOCUMENTS

| CN | 104484295 A | 4/2015 |
| CN | 105577801 A | 5/2016 |
| CN | 103546258 B | 1/2017 |

OTHER PUBLICATIONS

Lu, Y., et al., "Memory Efficient Loss Recovery for Hardware-base Transport in Datacenter," Networking, ACM, XP058371641, Aug. 3, 2017, pp. 22-28.

*Primary Examiner* — Obaidul Huq

(74) *Attorney, Agent, or Firm* — Conley Rose, P.C.

(57) ABSTRACT

A data transmission method includes encapsulating, by a first device, first target data into N remote direct memory access (RDMA) packets according to an RDMA protocol, sequentially sending, by the first device, the N RDMA packets to the second device according to a packet sequence number (PSN) sequence of the N RDMA packets, where each of the N RDMA packets carries a first data write address, and the first data write address is an address for writing data in each of the N RDMA packets into the second device such that the second device directly obtains the first data write address in each RDMA packet from the RDMA packet, and writes the target data into storage space corresponding to the first data write address.

20 Claims, 9 Drawing Sheets

(51) Int. Cl.
*G06F 12/1081* (2016.01)
*H04L 1/08* (2006.01)
*H04L 1/16* (2006.01)
*H04L 12/46* (2006.01)
*H04L 47/2466* (2022.01)

(52) U.S. Cl.
CPC ........ *H04L 1/1614* (2013.01); *H04L 12/4633* (2013.01); *H04L 47/2466* (2013.01); *H04L 2212/00* (2013.01)

(58) Field of Classification Search
USPC .................................................. 370/464, 474
See application file for complete search history.

(56) References Cited

U.S. PATENT DOCUMENTS

| | | |
|---|---|---|
| 2015/0172226 A1 | 6/2015 | Borshteen et al. |
| 2016/0212214 A1 | 7/2016 | Rahman et al. |
| 2017/0149890 A1* | 5/2017 | Shamis ............. G06F 15/17331 |
| 2017/0300437 A1 | 10/2017 | Shi et al. |
| 2017/0324814 A1 | 11/2017 | Romem et al. |
| 2020/0334195 A1* | 10/2020 | Chen ................... H04L 67/1097 |

\* cited by examiner

| Bits | 31-24 | 23-16 | 15-8 | 7-0 |
|---|---|---|---|---|
| 0-3 | Acknowledgement indication field | Message sequence number field | | |

FIG. 11

| Bit 7 | Bit 6:5 | Bit 4:0 | Definition |
|---|---|---|---|
| 0 | 0 0 | C CCCC | Acknowledgment |
| 0 | 0 1 | T TTTT | Timer value |
| 0 | 1 0 | X XXXX | Selective retransmission indication |
| 0 | 1 1 | N NNNN | Negative acknowledgment |
| 1 | 0 0 | Y YYYY | A quantity of retransmission packets |

FIG. 12

DATA TRANSMISSION METHOD AND FIRST DEVICE

CROSS-REFERENCE TO RELATED APPLICATIONS

This application is a continuation of International Patent Application No. PCT/CN2018/124384, filed on Dec. 27, 2018, which claims priority to Chinese Patent Application No. 201711448880.9, filed on Dec. 27, 2017, both of which are hereby incorporated by reference in their entireties.

TECHNICAL FIELD

This application relates to the field of network communications technologies, and in particular, to a data transmission method and a first device.

BACKGROUND

Priority-based flow control (PFC) is a flow control mechanism for enhancing a conventional Ethernet flow control mechanism, avoiding a packet loss, and increasing a network throughput. A PFC flow control mechanism can effectively reduce a network packet loss rate, but may cause problems such as PFC congestion spreading, a PFC deadlock, a PFC storm, and a PFC transmission distance limitation, thereby reducing network transmission reliability.

A remote direct memory access (RDMA) protocol is a protocol using which data is directly transmitted from a system to a memory of another system using a network without intervention of an operating system. In the RDMA protocol, to-be-transmitted data is encapsulated into one or more RDMA packets, and the one or more RDMA packets are sent from a transmit end to a receive end. The receive end buffers the received RDMA packet into a buffer. When the receive end successfully receives all RDMA packets of the to-be-transmitted data, the receive end writes buffered data in the buffer into a memory of the receive end.

According to the RDMA protocol, a Go-Back-N retransmission mechanism is used to retransmit a lost packet. The Go-Back-N retransmission mechanism is a retransmission mechanism in which network transmission efficiency is greatly decreased even though a packet loss rate is very low. Therefore, the RDMA protocol is very sensitive to the packet loss rate. The RDMA protocol is generated to resolve a problem of a delay of data transmission between server sides during network communications. Because there is almost no packet loss during the data transmission between the server sides during the network communications, and the packet loss rate during the data transmission is very low, the RDMA protocol is used to effectively resolve the problem of the delay of the transmission between the server sides during the network communications.

The RDMA protocol can run on a plurality of data link layer protocols such as the Ethernet. With development of the RDMA protocol, the RDMA protocol is gradually applied to the Ethernet. In this case, the problem that the RDMA protocol is sensitive to the packet loss rate gradually emerges. When the RDMA protocol is applied to the Ethernet for data transmission, a network device in the Ethernet needs to enable the PFC flow control mechanism, to reduce impact of the network packet loss on the network transmission efficiency. However, with the PFC flow control mechanism is enabled, the network transmission reliability is reduced accordingly.

SUMMARY

This application provides a data transmission method and a first device, to reduce impact of a network packet loss on network transmission efficiency and improve network transmission reliability.

According to a first aspect, this application provides a data transmission method, including encapsulating, by a first device, first target data into N RDMA packets according to an RDMA protocol, where the first target data is data that needs to be written by the first device into a second device for storage, any one of the N RDMA packets carries a packet sequence number (PSN), and N is a positive integer greater than or equal to 2, and sequentially sending, by the first device, the N RDMA packets to the second device according to a PSN sequence of the N RDMA packets, where each of the N RDMA packets carries a first data write address, and the first data write address is an address for writing data in each of the N RDMA packets into the second device such that the second device directly obtains the first data write address in each RDMA packet from the RDMA packet, and writes the target data into storage space corresponding to the first data write address.

It can be learned from the foregoing technical solution that the data transmission method in this application has the following advantages.

Each RDMA packet in this technical solution carries the first data write address, and the first data write address is the address for writing the data in the RDMA packet into the second device. Therefore, when receiving each RDMA packet, the second device may directly obtain the corresponding first data write address from the packet, and immediately write the data in the packet into a memory of the second device. It may be understood that even if an RDMA packet is lost, writing another successfully received RDMA packet into the memory of the second device is not affected. This reduces impact of a network packet loss on a network transmission rate, and avoids a case in which network transmission efficiency is reduced because a large amount of data is buffered when the second device cannot determine a write address of another RDMA packet if one or more RDMA packets are lost. Therefore, according to the data transmission method in this application, it can be ensured that target data successfully transmitted is stored in storage space of the second device even if there is a packet loss, and that there is a specific network transmission rate even if the target data fails to be transmitted. This reduces impact of the network packet loss on the network transmission rate, and improves network transmission reliability to some extent.

With reference to the first aspect of the embodiments of this application, in a first possible implementation of the first aspect, after the sequentially sending, by the first device, the N RDMA packets to the second device according to a PSN sequence of the N RDMA packets, the method includes, if the N RDMA packets are not all successfully received by the second device, receiving, by the first device, a first retransmission indication packet sent by the second device, where the retransmission indication packet carries a retransmission PSN, the retransmission PSN is a PSN corresponding to a bit whose reception status is a reception failure state in a bitmap table of the second device, and a PSN of each of the N RDMA packets corresponds to one bit in the bitmap table, and sending, by the first device, a retransmission packet to the second device, where the retransmission packet is an RDMA packet that fails to be received and that corresponds to the retransmission PSN such that the second device stores data in the retransmission packet into the second device.

The retransmission indication packet indicates a PSN of the RDMA packet that fails to be received by the second device. In a retransmission process, a receive end may instruct a transmit end to retransmit only lost data such that the transmit end does not transmit another successfully received packet when retransmitting a lost packet. This can save a network transmission resource and increase network transmission efficiency.

With reference to the first aspect or the first possible implementation of the first aspect of the embodiments of this application, in a second possible implementation of the first aspect, any one of a second RDMA packet to an $N^{th}$ RDMA packet that correspond to the N RDMA packets carries an RDMA extended transport header (RETH), and the RETH is used to indicate the first data write address.

According to a second aspect, this application provides a data transmission method, including sending, by a first device, a data read request to a second device, where the data read request is generated according to a RDMA protocol, and carries a data read address and a second data write address, the data read address is a destination address of second target data stored in the second device, the second data write address is a destination address that is reserved in the first device and that is used to store the second target data read from the second device, and the second target data is data that needs to be read by the first device from the second device, and receiving, by the first device, A RDMA packets sequentially sent by the second device according to a PSN sequence of the A RDMA packets, where the A RDMA packets are obtained by the second device by encapsulating the second target data read from the data read address, each of the A RDMA packets carries a PSN, A is a positive integer greater than or equal to 2, and each of the A RDMA packets includes the second data write address corresponding to data of the packet, and directly obtaining, by the first device, the second data write address of each RDMA packet from each of successfully received B RDMA packets, where B is a positive integer less than or equal to A, and writing, by the first device, data of each of the B RDMA packets into storage space of the second data write address corresponding to the RDMA packet.

With reference to the second aspect of this application, in a first possible implementation of the second aspect of this application, after the receiving, by the first device, A RDMA packets sequentially sent by the second device according to a PSN sequence of the A RDMA packets, the method further includes determining, by the first device, a reception status of each bit in a bitmap table of the first device based on a reception situation of the A RDMA packets, where the reception status is a reception success state or a reception failure state, and the PSN of each of the A RDMA packets corresponds to one bit in the bitmap table of the first device.

With reference to the second aspect of this application or the first possible implementation of the second aspect of this application, in a second possible implementation of the second aspect of this application, after the receiving, by the first device, A RDMA packets sequentially sent by the second device according to a PSN sequence of the A RDMA packets, the method further includes, when B is less than A, determining, by the first device, a PSN corresponding to a bit whose reception status is a reception failure state in the bitmap of the first device as a retransmission PSN, sending, by the first device, a retransmission indication packet to the second device, where the retransmission indication packet carries the retransmission PSN, and receiving, by the first device, a retransmission packet sent by the second device based on the retransmission indication packet, where the retransmission packet is an RDMA packet that fails to be received and that corresponds to the retransmission PSN.

With reference to the second possible implementation of the second aspect of this application, in a third possible implementation of the second aspect of this application, the retransmission PSN is indicated using an acknowledgement (ACK) extended transport header (AETH) field in a negative acknowledgment packet defined in the RDMA protocol.

With reference to the second aspect of this application and any one of the first possible implementation to the third possible implementation of the second aspect, the data read request carries a second RETH field, and the second RETH field is used to indicate the second data write address.

Beneficial effects corresponding to the second aspect and the two implementations of the second aspect are similar to beneficial effects of the first aspect. Details are not described herein.

According to a third aspect, an embodiment of this application provides a network device, where the network device has functions of implementing actions of the first device according to the first aspect or the second aspect. The functions may be implemented by hardware, or may be implemented by hardware executing corresponding software. The hardware or the software includes one or more modules corresponding to the functions.

According to a fourth aspect, an embodiment of this application provides a network device. The network device includes a processor, a memory, a bus, and a communications interface, where the memory is configured to store a computer-executable instruction, the processor is connected to the memory using the bus, and when the network device runs, the processor executes the computer-executable instruction stored in the memory such that the network device is enabled to perform the data transmission method according to any one of the first aspect or the second aspect.

According to a fifth aspect, an embodiment of this application provides a computer-readable storage medium configured to store a computer software instruction used by the foregoing network device. When the computer software instruction is run on a computer, the computer is enabled to perform the data transmission method according to any one of the first aspect or the second aspect.

According to a sixth aspect, an embodiment of this application provides a computer program product including an instruction. When the computer program product is run on a computer, the computer is enabled to perform the data transmission method according to any one of the first aspect or the second aspect.

According to a seventh aspect, an embodiment of this application provides a network interface processing circuit. The network interface processing circuit includes a processing circuit and a communications interface circuit. The communications interface circuit is configured to perform a data sending and receiving operation, and the processing circuit is configured to perform the data transmission method according to any one of the first aspect or the second aspect. Optionally, the processing circuit may be specifically an application-specific integrated circuit (ASIC), or may be a field programmable gate array (FPGA) or another programmable logic device, a discrete gate or a transistor logic device, or a discrete hardware component.

According to an eighth aspect, an embodiment of this application provides a network adapter. The network adapter includes a network interface chip, a memory, and a host interface circuit. The memory is configured to store a computer operation instruction, the host interface circuit is configured to connect a host and the network adapter, and the network interface chip is configured to perform the data transmission method according to any one of the first aspect or the second aspect by invoking the computer operation instruction. Optionally, the memory may be a buffer.

According to a ninth aspect, an embodiment of this application provides a network device. The network device includes a network adapter, a host, and a memory. The network adapter may be the network adapter in the eighth aspect, the memory is configured to store a computer operation instruction, the network adapter is configured to receive or send data, and the host is configured to perform the data transmission method according to any one of the first aspect or the second aspect by invoking the computer operation instruction. Optionally, the network device may be specifically a server.

In addition, for technical effects brought by any design manner in the third aspect to the ninth aspect, refer to the technical effects brought by different design manners in the first aspect. Details are not described herein.

BRIEF DESCRIPTION OF DRAWINGS

FIG. 11 is a schematic diagram of a frame structure of an AETH according to an embodiment of this application.

FIG. 12 is a schematic diagram of an embodiment of a syndrome field in an AETH according to an embodiment of this application.

DESCRIPTION OF EMBODIMENTS

This application provides a data transmission method and a first device, to reduce impact of a network packet loss on network transmission efficiency and improve network transmission reliability. The following clearly describes the technical solutions in this application with reference to the accompanying drawings in this application. Apparently, the described embodiments are merely some embodiments rather than all of the embodiments in this application.

In this specification, claims, and accompanying drawings of this application, the terms "first", "second", "third", "fourth", and the like (if existent) are intended to distinguish between similar objects but do not necessarily indicate a specific order or sequence. It should be understood that data used in such a way is interchangeable in proper a circumstance so that the embodiments described herein can be implemented in other orders than the order illustrated or described herein. In addition, the terms "include", "have", and any other variants mean to cover non-exclusive inclusion, for example, a process, method, system, product, or device that includes a list of steps or units is not necessarily limited to those expressly listed steps or units, but may include other steps or units that are not expressly listed or inherent to such a process, method, product, or device.

The data transmission method in the embodiments of this application is mainly applicable to an RDMA transmission application scenario, and is particularly applicable to some network transmission scenarios in which a packet loss rate is comparatively high and a network transmission scenario in which network transmission reliability is reduced because a PFC flow control mechanism is enabled, such as a scenario in which an RDMA protocol is converged into the conventional Ethernet for data transmission. According to the data transmission method in the embodiments of this application, a data transmission problem in the foregoing application scenario can be effectively resolved, thereby increasing network transmission efficiency and improving network transmission reliability.

Figure 1:
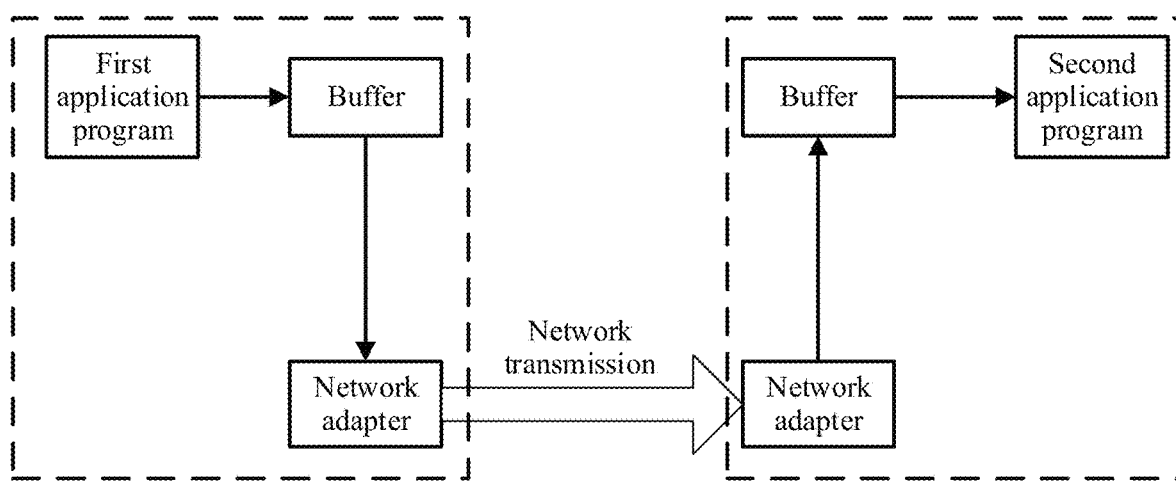
FIG. 1 is a system framework diagram of a data transmission method according to an embodiment of this application.

When an application program initiates an RDMA read/write request, a system does not perform a data replication action. This reduces times of context switching between kernel space and user space during network communications processing. In a condition that no kernel memory is required to participate, an RDMA request is sent to a local network adapter from an application program running in user space, and then is transmitted to a remote adapter using a network. An operating system does not need to participate in RDMA transmission such that system load is not increased. FIG. 1 is a system framework diagram of a data transmission method according to an embodiment of this application. The figure shows a transmission scenario of RDMA transmission. A first application program reads data from a memory to generate an RDMA packet, and sends, to a local network adapter, the RDMA packet after being buffered, and then transmits the RDMA packet to a remote network adapter using a network. The remote network adapter buffers the received RDMA packet, and a second application program reads data from a buffer and writes the data into a memory. Similarly, a process in which the first application program reads the data in the memory of the second application program is similar to the foregoing description of the write process. Details are not described herein. In addition, the network adapter includes a host channel adapter (HCA).

To facilitate understanding of the data transmission method in the embodiments of this application, the following describes the data transmission method in the embodiments of this application in detail from two aspects data write and data read. Details are as follows.

1. RDMA-Based Data Write Method

Figure 2:
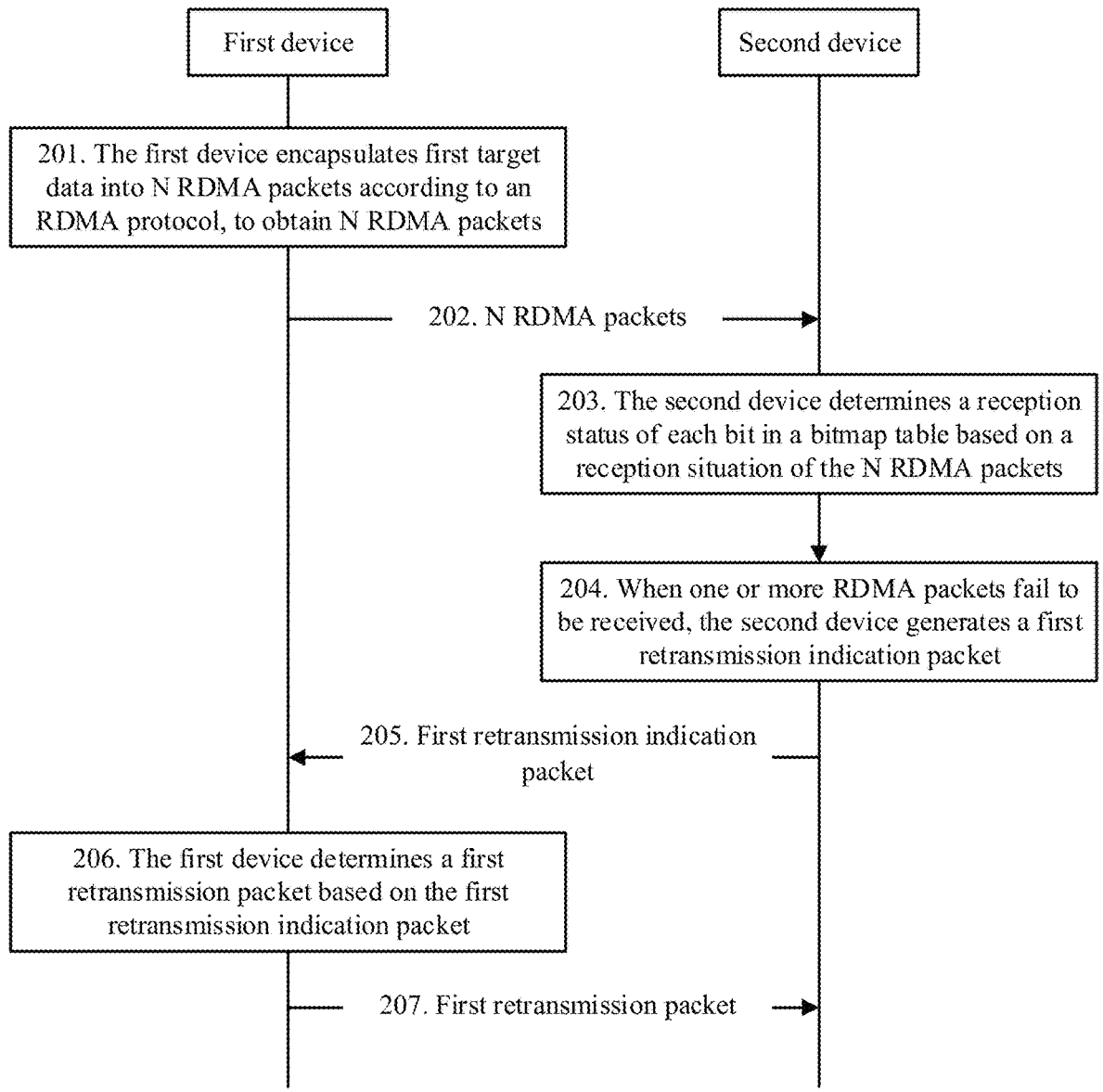
FIG. 2 is a schematic diagram of an embodiment of a data transmission method according to an embodiment of this application.

FIG. 2 is a schematic diagram of an embodiment of a data transmission method according to an embodiment of this application.

As shown in FIG. 2, an embodiment of a data transmission method according to an embodiment of this application includes the following steps.

201. A first device encapsulates first target data into N RDMA packets according to an RDMA protocol, to obtain N RDMA packets.

The first target data is data that needs to be written by the first device into a memory of a second device, each of the N RDMA packets has a corresponding PSN, and N is a positive integer greater than or equal to 2. Each of the N RDMA packets carries a first data write address corresponding to the packet data. Therefore, the device may directly obtain, from each RDMA packet, the first data write address corresponding to the packet data.

The first data write address is a type of addresses, and specific values of the addresses are different. Data write addresses corresponding to different values are substantially corresponding to different storage space. Each RDMA packet carries a value of the first data write address, to indicate different first data write addresses. Similarly, a second data address described in the following is similar to the first data address described herein. Details are not described in the following.

The memory may be memory space of an application program in the second device, and the first target data may be data stored in memory space of an application program in the first device.

Figure 9:
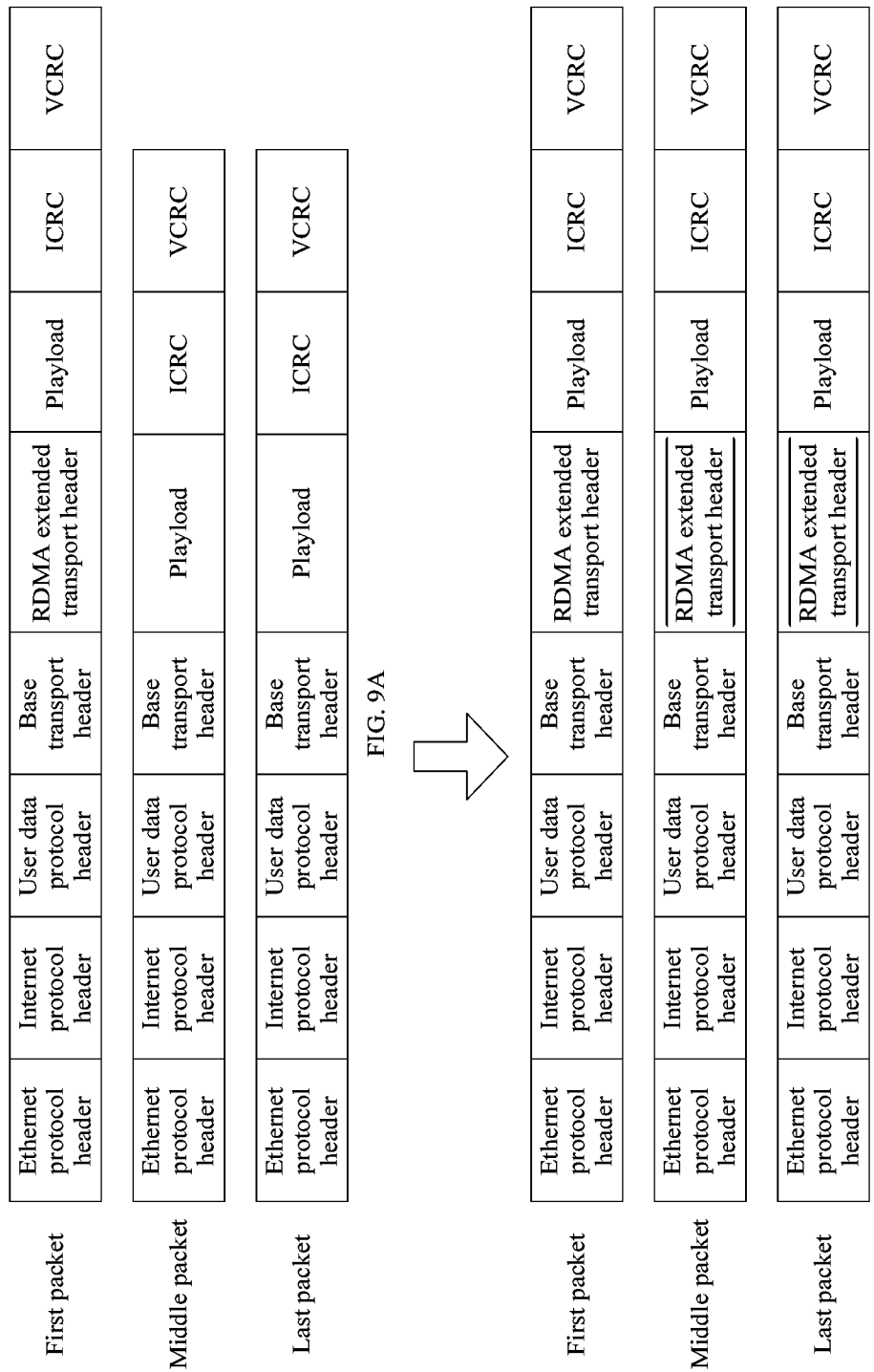
FIG. 9A and FIG. 9B are a schematic diagram of an extended structure of an RDMA packet according to an embodiment of this application.
Figure 10:
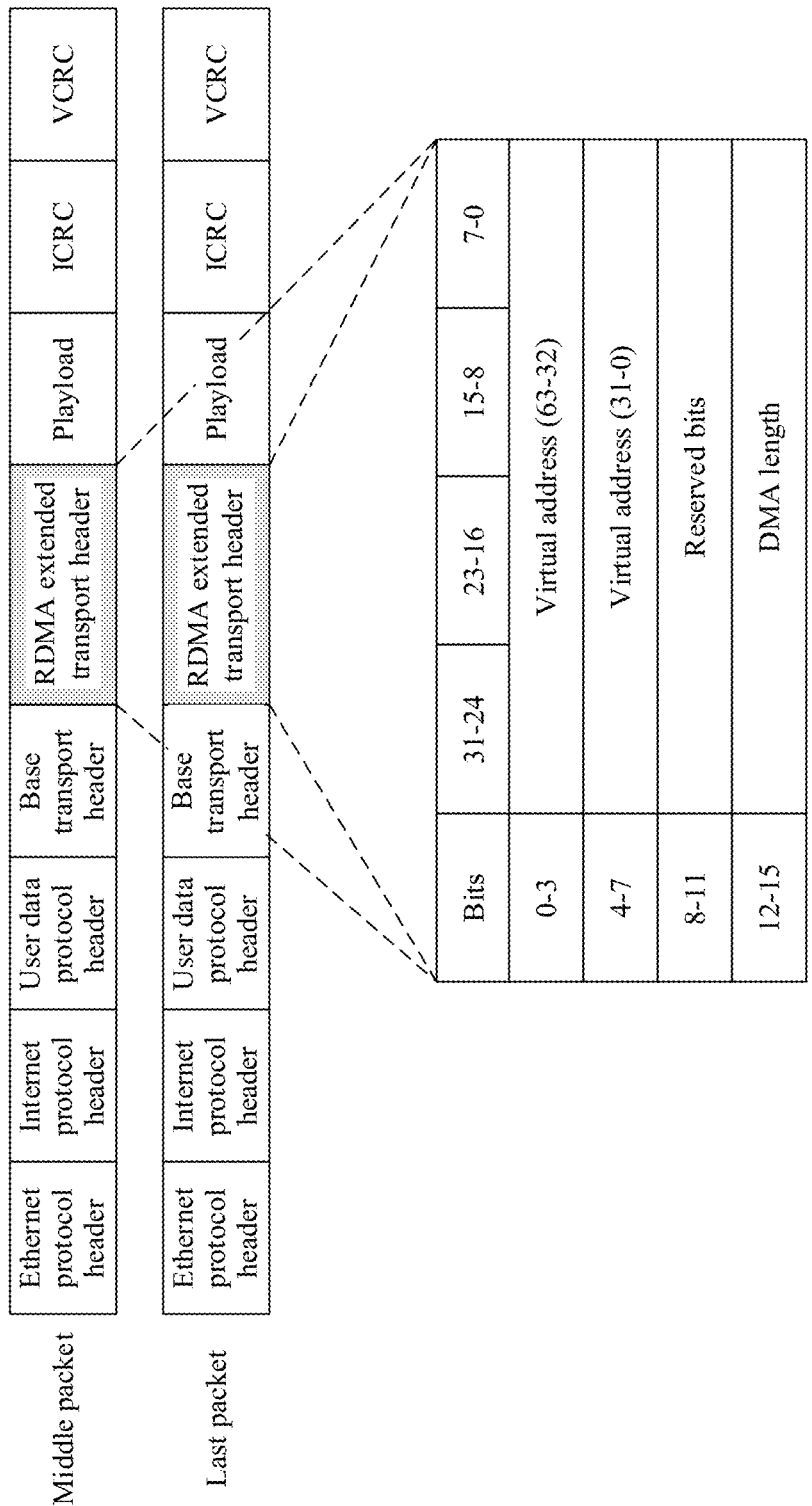
FIG. 10 is a schematic diagram of an embodiment of a RETH according to an embodiment of this application.

The N RDMA packets may be specifically an RDMA write packet, and the RDMA write packet includes the following three types an RDMA write first packet, an RDMA write middle packet, and an RDMA write last packet. A RETH is a field in an RDMA packet format, and the field carries a destination address of the packet data. A base transport header (BTH) is a field in the RDMA packet format, and includes a PSN. In an existing RDMA write packet, an RDMA write first packet has both a BTH field and a RETH field. Therefore, the RDMA write first packet includes a PSN and a first data write address. However, an RDMA write middle packet and an RDMA write last packet each have only a BTH field. Based on the foregoing packet format, in the data transmission method in this application, the RETH field is added to the RDMA write middle packet and the RDMA write last packet (as shown by gray parts in FIG. 9) such that each of the N RDMA packets carries the first data write address. FIG. 9A and FIG. 9B are a schematic diagram of an extended structure of an RDMA write packet according to an embodiment of this application. FIG. 9A shows a frame structure of a non-extended RDMA packet. FIG. 9B shows a frame structure of an extended RDMA packet, and gray parts in FIG. 9B show newly added RETHS. Further, FIG. 10 is a schematic diagram of an embodiment of an RETH according to an embodiment of this application. 32 bits are used as an example in FIG. 10. It should be noted that a frame structure of another part of the packet in FIG. 9A and FIG. 9B is similar to a packet structure in the existing RDMA protocol. Details are not described herein.

Each of the three types of RDMA write packets, namely, the RDMA write first packet, RDMA write middle packet, and RDMA write last packet in this application carries the RETH field, and therefore, when receiving any one of the N RDMA packets, a receiving device may directly obtain the first data write address corresponding to the packet data such that the packet data can be directly written into memory space of the application program without being buffered in a buffer.

A maximum transmission unit (MTU) is a maximum data packet size that can be transmitted in each RDMA transmission in the RDMA protocol, and a quantity N of the RDMA packets may be determined based on a data volume and an MTU of the first target data.

202. The first device sequentially sends the N RDMA packets to the second device according to a PSN sequence of the N RDMA packets.

For example, five RDMA packets are obtained based on step 201. A first RDMA packet is an RDMA write first packet, and a PSN of the first RDMA packet is equal to 0. A fifth packet is an RDMA write last packet, and a PSN of the fifth packet is equal to 4. Remaining three packets are RDMA write middle packets, and PSNs of the remaining three packets are respectively 1, 2, and 3. The first device sequentially sends the five RDMA packets to the second device according to a PSN sequence.

203. The second device determines a reception status of each bit in a bitmap table based on a reception situation of the N RDMA packets.

For each RDMA transmission, a one-to-one mapping relationship is established between the N RDMA packets and the bitmap table using PSNs, and one PSN corresponds to one bit. The reception status includes a reception success state or a reception failure state. For example, if a bit is 0, it indicates that a packet fails to be received, and if a bit is 1, it indicates that a packet is successfully received.

The second device may further determine the reception status of each bit in the bitmap table based on the PSN obtained from the BTH field in the RDMA write packet.

204. When one or more RDMA packets fail to be received, the second device generates a first retransmission indication packet.

When one or more RDMA packets in the N packets fail to be received, the second device determines a PSN corresponding to a bit whose reception status is a reception failure state in the bitmap table as a first retransmission PSN. Then, the second device generates the first retransmission indication packet based on the first retransmission PSN, where the first retransmission indication packet is a selective indication packet, used to instruct the first device to transmit only one or more packets that are not successfully received. For example, if a packet whose PSN is equal to 1 and a packet whose PSN is equal to 4 fail to be received, the first retransmission indication packet is used to instruct the first device to transmit only two packets whose PSNs are respectively equal to 1 and 4, and there is no need to perform transmission starting from the packet whose PSN is equal to 1 to all subsequent packets.

In the RDMA protocol, a negative acknowledgment (NACK) packet is used to instruct a transmit end to retransmit all packets starting from a specific lost packet. The transmit end cannot retransmit only the lost packet. Therefore, in the data transmission method in this application, a selective retransmission indication packet is newly defined by reusing an original NACK packet format the NACK packet in the RDMA protocol includes an AETH field, and a definition (as shown in FIG. 11 and FIG. 12) of the selective retransmission indication packet is newly added to the AETH field such that the NACK packet may instruct the first device to retransmit only an RDMA packet that fails to be received.

FIG. 11 is a schematic diagram of a frame structure of an AETH according to an embodiment of this application. As shown in FIG. 11, the AETH has 32 bits in total, where a $31^{th}$ bit to a $24^{th}$ bit indicate an acknowledgment indication field, a range of the acknowledgment indication (syndrome) field indicates information corresponding to an ACK or a NACK, a $0^{th}$ bit to a $23^{rd}$ bit indicate a message sequence number (MSN) field, and the MSN field indicates a sequence number corresponding to a message that has been transmitted in an acknowledgment response. Further, as described above, in this embodiment of this application, the selective retransmission indication is newly added to the AETH field. Specifically, FIG. 12 is a schematic diagram of an embodiment of a syndrome field in an AETH according to an embodiment of this application. Compared with an existing syndrome field, gray parts in FIG. 12 indicates a newly added selective retransmission indication, in other words, bits (a $7^{th}$ bit to a $5^{th}$ bit) are in a (0 1 0) state. Optionally, the selective retransmission indication may further indicate a quantity of retransmission packets and a sequence number of a start retransmission packet. In addition to the foregoing (0 1 0) state that is a newly added indication state, four other states (000, 001, 011, 100) are existing states. Details are not described in this application.

205. The second device sends the first retransmission indication packet to the first device.

The second device sends the first retransmission indication packet to the first device, where the first retransmission indication packet carries the first retransmission PSN, and the first retransmission PSN is a PSN of an RDMA packet that fails to be received by the second device.

206. The first device determines a first retransmission packet based on the first retransmission indication packet.

First, the first device parses the first retransmission indication packet sent by the second device, to obtain the first retransmission PSN. Then, the first device determines, based on the first retransmission PSN, an RDMA packet that needs to be retransmitted in the N RDMA packets, to obtain the first retransmission packet.

207. The first device sends the first retransmission packet to the second device.

The first device sends the first retransmission packet to the second device, where the first retransmission packet includes only the RDMA packet that fails to be received by the second device.

In this embodiment, each RDMA packet carries a first data write address. After receiving the RDMA packet, the receive end can directly obtain the first data write address corresponding to the packet data such that the receive end can store the packet data of each packet without buffering the packet data. This saves buffer space, and a lost packet does not affect learning of a data write address of a successfully received packet by the receive end such that RDMA data transmission is insensitive to a network packet loss rate, thereby increasing network transmission efficiency and a network throughput.

In a retransmission process, the receive end may instruct the transmit end to retransmit only lost data such that the transmit end does not transmit another successfully received packet when retransmitting a lost packet. This can save a network transmission resource and increase network transmission efficiency.

2. RDMA-Based Data Read Method

Figure 3:
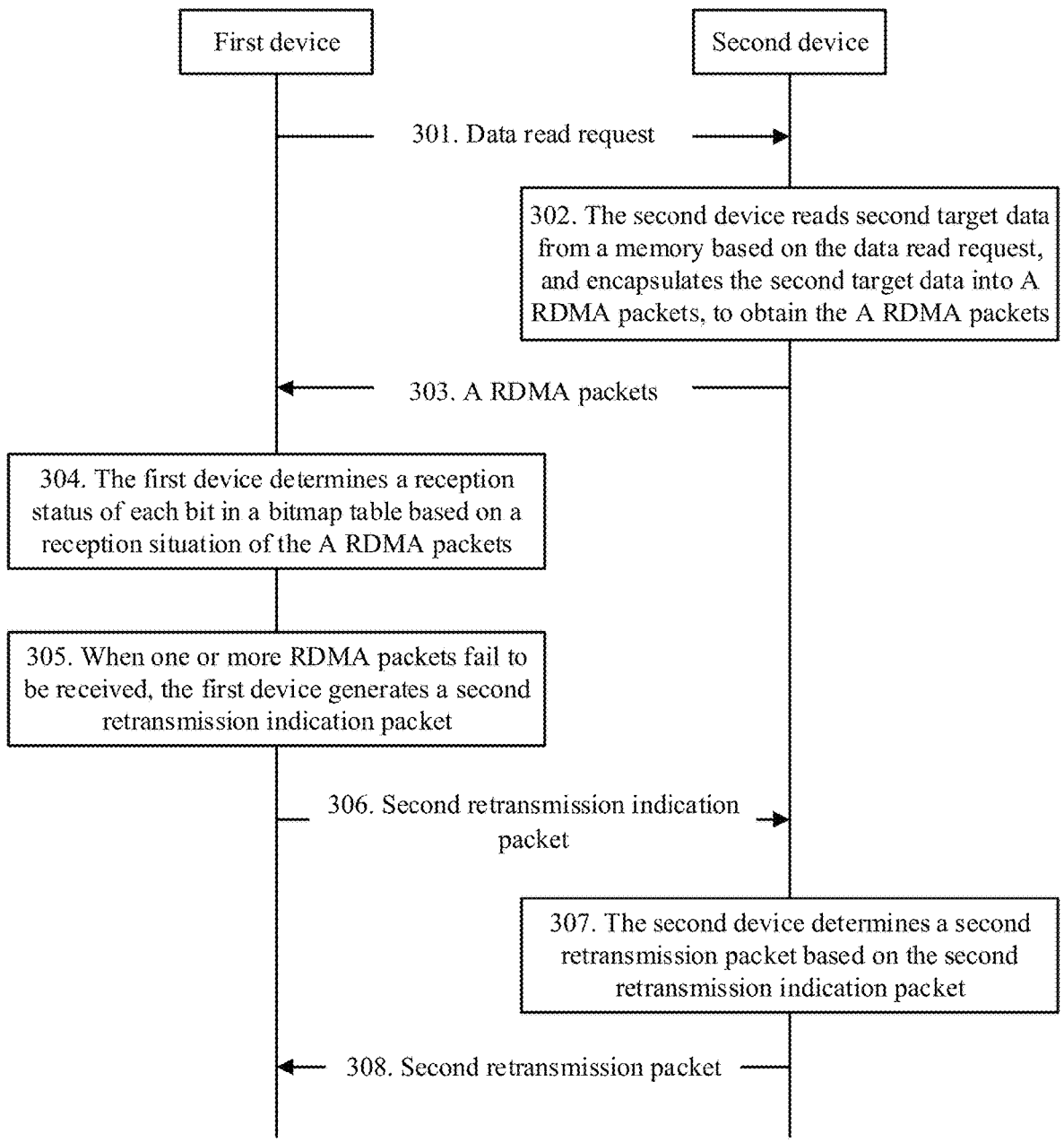
FIG. 3 is a schematic diagram of another embodiment of a data transmission method according to an embodiment of this application.

FIG. 3 is a schematic diagram of another embodiment of a data transmission method according to an embodiment of this application.

As shown in FIG. 3, another embodiment of a data transmission method according to an embodiment of this application includes the following steps.

301. A first device sends a data read request to a second device.

The data read request is generated by the first device according to an RDMA protocol, and the data read request includes a data read address and a second data write address. The data read address is a destination address of second target data that is stored in the second device and that needs to be read by the first device, and the second data write address is a destination address used to store the second target data after the first device reads the second target data in the second device.

The data read request may be further an RDMA read request in the RDMA protocol. Currently, a RETH field in the RDMA read request in the RDMA protocol includes the data read address, but does not include the second data write address. In this application, an RDMA read request packet format is redesigned (as shown in FIG. 13), and a RETH 2 field of a second RETH (RETH 2 is used for a read operation, a format may be referred to that of the RETH, and the number 2 is used to differ from the RETH) is added to the RDMA read request packet, where the RETH 2 field carries information about the second data write address (for example, the RETH 2 field carries the information about the second data write address using a virtual address field in FIG. 13).

Figure 13:
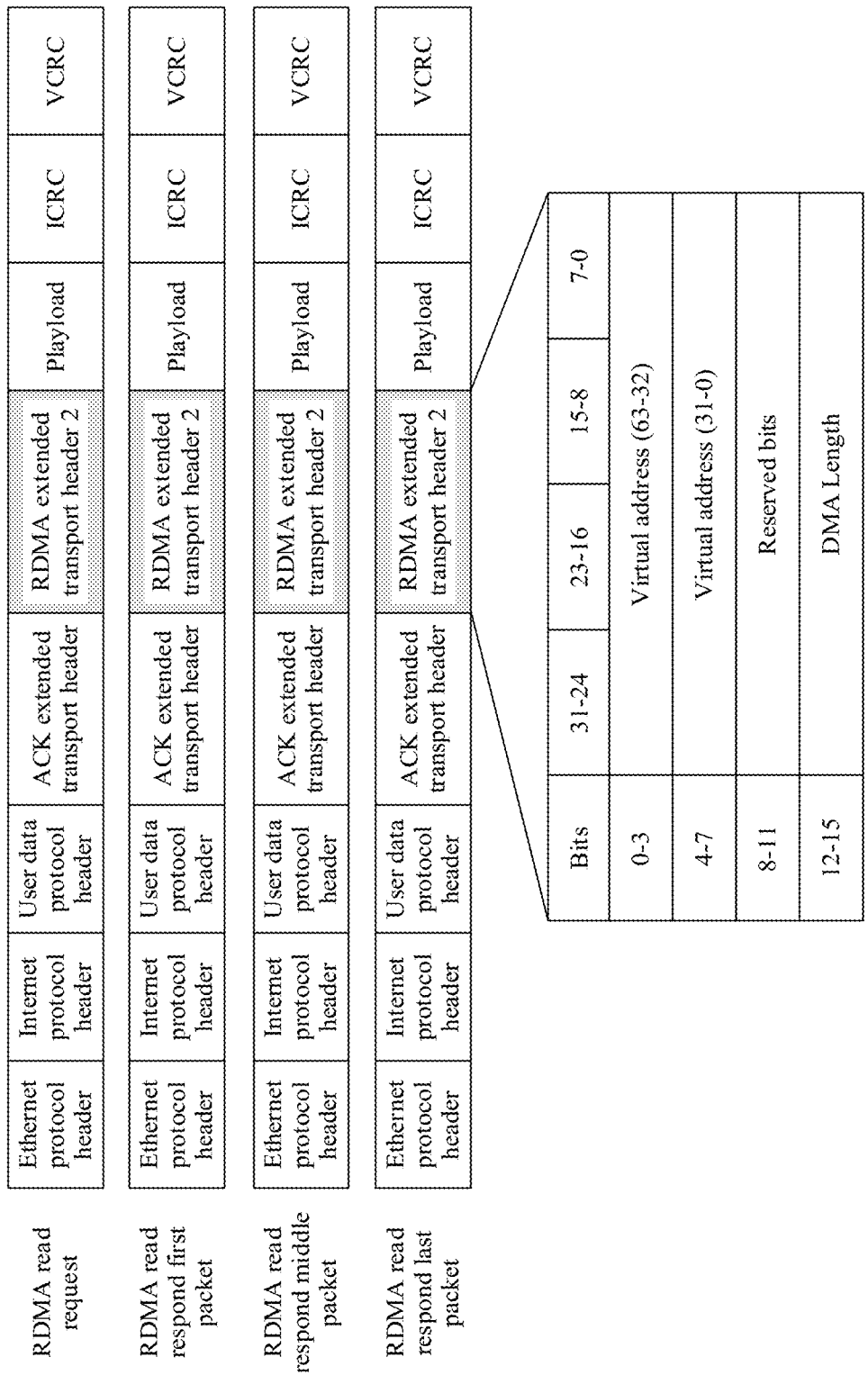
FIG. 13 is a schematic diagram of a frame structure of an RDMA read request and a frame structure of an RDMA read response packet according to an embodiment of this application.

FIG. 13 is a schematic diagram of a frame structure of an RDMA read request and a frame structure of an RDMA read response packet according to an embodiment of this application. As shown in gray parts in FIG. 13, a RETH 2 field is added to both the RDMA read request and the RDMA read response packet. A RETH field is a field used to indicate a memory address in the RDMA protocol. In other words, a RETH 2 field is newly added to indicate the second data write address. The second data write address is a type of addresses, and specific values of the addresses may be different. A description of the RETH 2 field in FIG. 13 is similar to the description in FIG. 10. For a related description, refer to the description in FIG. 10. Optionally, the RDMA read response packet may be further an RDMA read respond packet. The RDMA read respond packet may be classified into three types based on a packet location an RDMA read respond first packet, an RDMA read respond middle packet, and an RDMA read respond last packet.

302. The second device reads the second target data from a memory based on the data read request packet, and encapsulates the second target data into A RDMA packets, to obtain the A RDMA packets.

First, the second device reads the second target data from storage space corresponding to the data read address in the data read request packet. Then, the second device encapsulates the second target data into the A RDMA packets such that each of the A RDMA packets includes the second data write address corresponding to packet data. Each of the A RDMA packets includes a PSN, and A is a positive integer greater than or equal to 2.

The A RDMA packets further include three types of packets an RDMA read respond first packet, an RDMA read respond middle packet, and an RDMA read respond last packet. However, the foregoing three packets in the current RDMA do not include the second data write address corresponding to the packet data. Therefore, the foregoing three types of packets are redesigned in this application, a RETH 2 field is added to each of the three types of packets the RDMA read respond first packet, the RDMA read respond middle packet, and the RDMA read respond last packet such that the newly added RETH2 field carries the second data write address corresponding to the packet data. The RDMA read respond packet redesigned in this application is shown in FIG. 13.

Other related descriptions of step 302 are similar to the descriptions in step 201. Details are not described herein.

303. The second device sequentially sends the A RDMA packets to the first device according to a PSN sequence of the A RDMA packets.

For example, five RDMA packets are obtained based on step 302. A first RDMA packet is an RDMA read respond first packet, and a PSN of the first RDMA packet is equal to 0. A fifth packet is an RDMA read respond last packet, and a PSN of the fifth packet is equal to 4. Remaining three packets are RDMA read respond middle packets, and PSNs of the remaining three packets are respectively 1, 2, and 3. The second device sequentially sends the five RDMA packets to the first device according to a PSN sequence.

304. The first device determines a reception status of each bit in a bitmap table based on a reception situation of the A RDMA packets.

Step 304 is similar to the foregoing step 203, and details are not described herein. A difference lies in that the bitmap table is maintained by the first device end.

305. When one or more RDMA packets fail to be received, the first device generates a second retransmission indication packet.

When one or more RDMA packets in the A packets fail to be received, the first device determines a PSN corresponding to a bit whose reception status is a reception failure state in the bitmap table as a second retransmission PSN. Then, the first device generates the second retransmission indication packet based on the second retransmission PSN, where the second retransmission indication packet is a selective indication packet, used to instruct the second device to transmit only one or more packets that are not successfully received. For example, if a packet whose PSN is equal to 1 and a packet whose PSN is equal to 4 fail to be received, the second retransmission indication packet is used to instruct the second device to transmit only two packets whose PSNs are respectively equal to 1 and 4, and there is no need to perform transmission starting from the packet whose PSN is equal to 1 to all subsequent packets.

A definition and a related description about a selective retransmission indication packet in this step are similar to the description in the foregoing step 204. Details are not described herein.

306. The first device sends the second retransmission indication packet to the second device.

The first device sends the second retransmission indication packet to the second device, where the second retransmission indication packet carries the second retransmission PSN, and the second retransmission PSN is a PSN of an RDMA packet that fails to be received by the first device.

307. The second device determines a second retransmission packet based on the second retransmission indication packet.

First, the second device parses the second retransmission indication packet sent by the first device, to obtain the second retransmission PSN. Then, the second device determines, based on the second retransmission PSN, an RDMA packet that needs to be retransmitted in the A RDMA packets, to obtain the second retransmission packet.

308. The second device sends the second retransmission packet to the first device.

The second device sends the second retransmission packet to the first device, where the second retransmission packet includes only the RDMA packet that fails to be received by the first device.

In this embodiment, beneficial effects corresponding to the data read method are similar to beneficial effects of the data write method. Details are not described herein.

Figure 4:
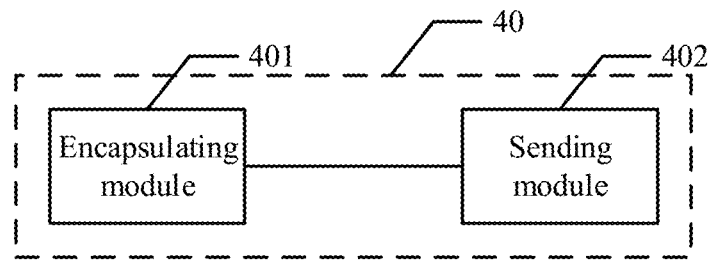
FIG. 4 is a schematic diagram of an embodiment of a first device according to an embodiment of this application.

FIG. 4 shows an embodiment of a first device 40 according to an embodiment of this application. The first device 40 includes an encapsulating module 401 configured to encapsulate first target data into N RDMA packets according to a RDMA protocol, where the first target data is data that needs to be written by the first device into a second device for storage, any one of the N RDMA packets carries a PSN, and N is a positive integer greater than or equal to 2, and a sending module 402 configured to sequentially send the N RDMA packets to the second device according to a PSN sequence of the N RDMA packets, where each of the N RDMA packets carries a first data write address, and the first data write address is an address for writing data in each of the N RDMA packets into the second device such that the second device directly obtains the first data write address in each RDMA packet from the RDMA packet, and writes the target data into storage space corresponding to the first data write address.

Figure 5:
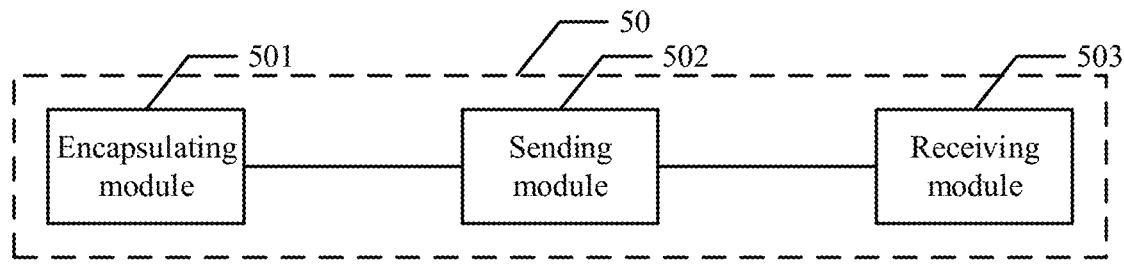
FIG. 5 is a schematic diagram of another embodiment of a first device according to an embodiment of this application.

In an example, as shown in FIG. 5, a first device 50 further includes a receiving module 503 configured to, if the N RDMA packets are not all successfully received by the second device, receive a first retransmission indication packet sent by the second device, where the retransmission indication packet carries a retransmission PSN, the retransmission PSN is a PSN corresponding to a bit whose reception status is a reception failure state in a bitmap table of the second device, and a PSN of each of the N RDMA packets corresponds to one bit in the bitmap table, and a sending module 502 configured to send a first retransmission packet to the second device, where the first retransmission packet is an RDMA packet that fails to be received and that corresponds to the first retransmission PSN such that the second device stores data in the first retransmission packet into the second device.

In an example, any one of a second RDMA packet to an $N^{th}$ RDMA packet that correspond to the N RDMA packets carries an RETH, and the RETH is used to indicate the first data write address.

Figure 6:
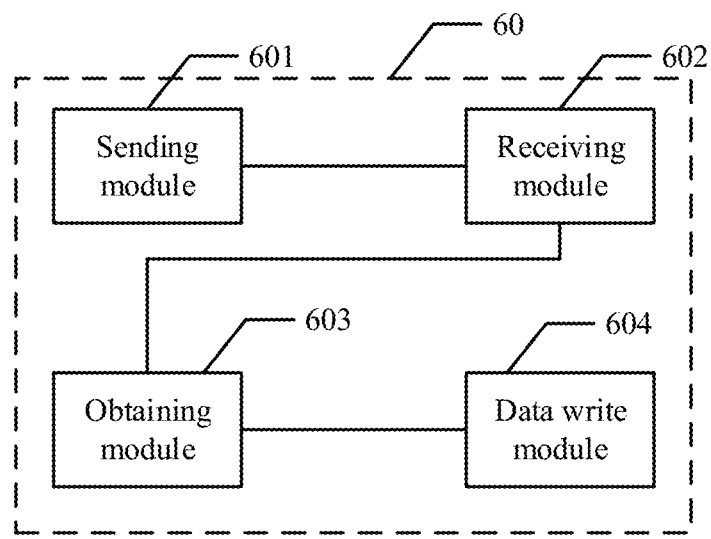
FIG. 6 is a schematic diagram of still another embodiment of a first device according to an embodiment of this application.

FIG. 6 shows an embodiment of a first device 60 according to an embodiment of this application. The first device 60 includes a sending module 601 configured to send a data read request packet to a second device, where the data read request packet is generated according to a RDMA protocol, and carries a data read address and a second data write address, the data read address is a destination address of second target data stored in the second device, the second data write address is a destination address that is reserved in the first device and that is used to store the second target data read from the second device, and the second target data is data that needs to be read by the first device from the second device, a receiving module 602 configured to receive A RDMA packets sequentially sent by the second device according to a PSN sequence of the A RDMA packets, where the A RDMA packets are obtained by the second device by encapsulating the second target data read from the data read address, each of the A RDMA packets carries a PSN, A is a positive integer greater than or equal to 2, and each of the A RDMA packets includes the second data write address corresponding to data of the packet, an obtaining module 603 configured to directly obtain the second data write address of each RDMA packet from each of successfully received B RDMA packets, where B is a positive integer less than or equal to A, and a data write module 604 configured to write data of each of the B RDMA packets into storage space of the second data write address corresponding to the RDMA packet.

Figure 7:
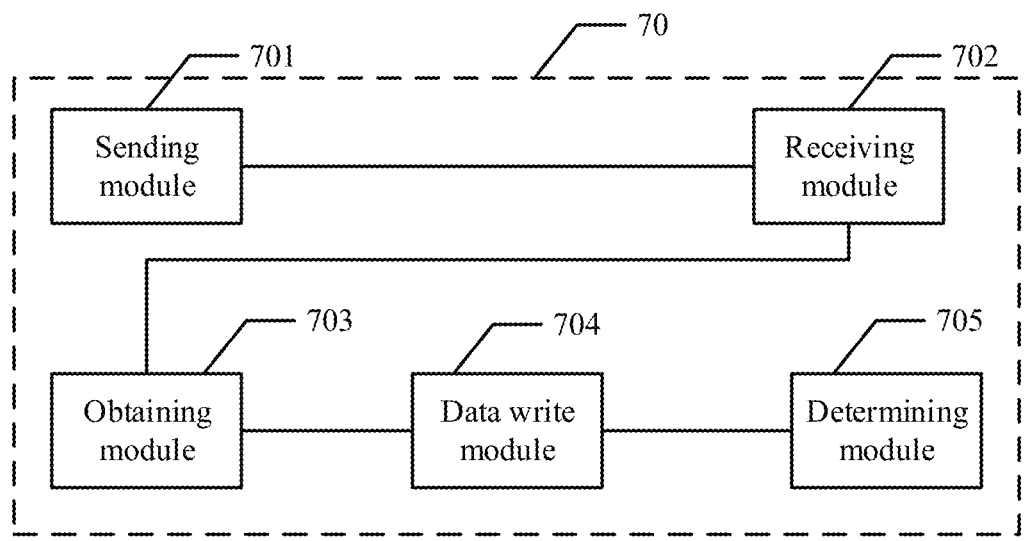
FIG. 7 is a schematic diagram of yet another embodiment of a first device according to an embodiment of this application.

In an example, as shown in FIG. 7, a network device 70 further includes a determining module 705 configured to determine a reception status of each bit in a bitmap table of the first device based on a reception situation of the A RDMA packets, where the reception status is a reception success state or a reception failure state, and the PSN of each of the A RDMA packets corresponds to one bit in the bitmap table of the first device.

In another example, the determining module 705 is further configured to, when B is less than A, determine a PSN corresponding to a bit whose reception status is a reception failure state in the bitmap of the first device as a second retransmission PSN, a sending module 701 is further configured to send a second retransmission indication packet to the second device, where the second retransmission indication packet carries the second retransmission PSN, and a receiving module 702 is further configured to receive a second retransmission packet sent by the second device based on the second retransmission indication packet, where the second retransmission packet is an RDMA packet that fails to be received and that corresponds to the second retransmission PSN.

In an example, the retransmission PSN is indicated using an AETH field in a negative acknowledgment packet defined in the RDMA protocol.

In an example, the data read request carries a second RETH field, and the second RETH field is used to indicate the second data write address.

For other related descriptions and beneficial effects in this embodiment, refer to the descriptions of the first device in the embodiments corresponding to FIG. 2 and FIG. 3. Details are not described herein.

Figure 8:
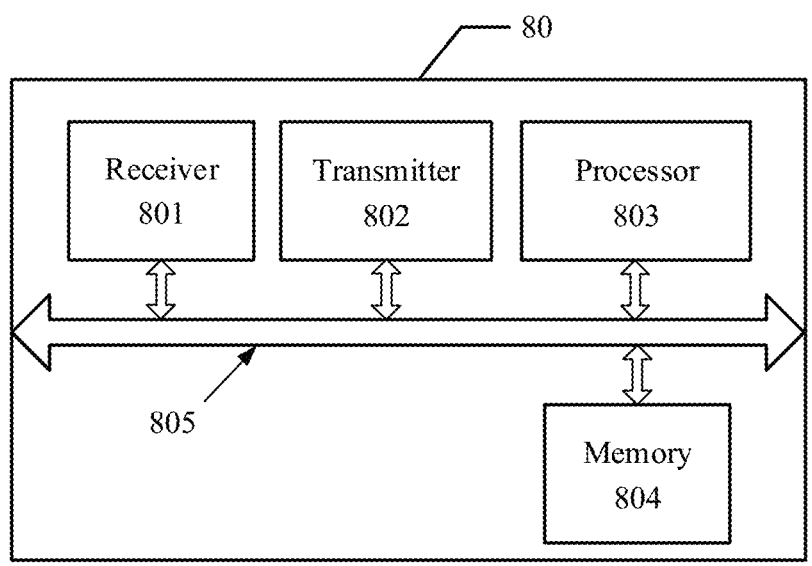
FIG. 8 is a schematic diagram of a hardware structure of a first device according to an embodiment of this application.

FIG. 8 is a schematic diagram of a hardware structure of a first device according to an embodiment of this application. The first device includes a receiver 801, a transmitter 802, a processor 803, a memory 804, and a bus 805.

The memory 804 may include a read-only memory (ROM) and a random access memory (RAM), and provide an instruction and data to the processor 803. A part of the memory 804 may further include a non-volatile random access memory (NVRAM).

The memory 804 stores the following elements an executable module or a data structure, a subset thereof, or an extended set thereof.

Operation instructions include various operation instructions and used to implement various operations.

Operating systems include various system programs and used to implement various basic services and process a hardware-based task.

The processor 803 in this embodiment of this application may be configured to perform operations corresponding to the first device in the embodiment corresponding to FIG. 2, and the operations may include the following operations encapsulating first target data into N RDMA packets according to a RDMA protocol, where the first target data is data that needs to be written by the first device into a second device for storage, any one of the N RDMA packets carries a PSN, and N is a positive integer greater than or equal to 2, sequentially sending the N RDMA packets to the second device according to a PSN sequence of the N RDMA packets, where each of the N RDMA packets carries a first data write address, and the first data write address is an address for writing data in each of the N RDMA packets into the second device such that the second device directly obtains the first data write address in each RDMA packet from the RDMA packet, and writes the target data into storage space corresponding to the first data write address.

The processor 803 is further configured to perform other related operations in the embodiment corresponding to FIG. 2. For a detailed description, refer to the description in the embodiment corresponding to FIG. 2. Details are not described herein.

In addition, the processor 803 may be configured to perform operations corresponding to the first device in the embodiment corresponding to FIG. 3, and the operations may include the following operations sending a data read request to a second device, where the data read request is generated according to a RDMA protocol, and carries a data read address and a second data write address, the data read address is a destination address of second target data stored in the second device, the second data write address is a destination address that is reserved in the first device and that is used to store the second target data read from the second device, and the second target data is data that needs to be read by the first device from the second device, receiving A RDMA packets sequentially sent by the second device according to a PSN sequence of the A RDMA packets, where the A RDMA packets are obtained by the second device by encapsulating the second target data read from the data read address, each of the A RDMA packets carries a PSN, A is a positive integer greater than or equal to 2, and each of the A RDMA packets includes the second data write address corresponding to data of the packet, directly obtaining the second data write address of each RDMA packet from each of successfully received B RDMA packets, where B is a positive integer less than or equal to A, and writing data of each of the B RDMA packets into storage space of the second data write address corresponding to the RDMA packet.

The processor 803 is further configured to perform other related operations in the embodiment corresponding to FIG. 3. For a detailed description, refer to the description in the embodiment corresponding to FIG. 3. Details are not described herein.

The processor 803 controls an operation of the first device, and the processor 803 may also be referred to as a central processing unit (CPU). The memory 804 may include a ROM and a RAM, and provide an instruction and data to the processor 803. A part of the memory 804 may further include an NVRAM. In specific application, components of the first device are coupled together using a bus system 805, where the bus system 805 may further include a power bus, a control bus, a state signal bus, and the like in addition to a data bus. However, for clarity of description, various buses are marked as the bus system 805 in the figure.

The methods disclosed in the foregoing embodiments of this application may be applied to the processor 803, or may be implemented by the processor 803. The processor 803 may be an integrated circuit chip and has a signal processing capability. In an implementation process, the steps in the foregoing methods may be accomplished using a hardware integrated logic circuit in the processor 803, or using instructions in a form of software. The processor 803 may be a general-purpose processor, a digital signal processor (DSP), an ASIC, a FPGA or another programmable logic device, a discrete gate or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor, or the like. The steps of the methods disclosed with reference to the embodiments of this application may be directly executed and accomplished by a hardware decoding processor, or executed and accomplished using a combination of hardware and a software module in a decoding processor. The software module may be located in a mature storage medium in the art, such as a RAM, a flash memory, a ROM, a programmable read-only memory (PROM), an electrically erasable programmable read-only memory (EEPROM), a register, or the like. The storage medium is located in the memory 804, and the processor 803 reads information in the memory 804 and accomplishes the steps of the foregoing methods in combination with the hardware of the processor 803.

For a related description of FIG. 8, refer to related descriptions and effects of the methods in FIG. 2 and FIG. 3 for understanding. Details are not described herein.

An embodiment of this application further provides a computer storage medium configured to store a computer software instruction used by the foregoing first device. When the computer software instruction is run on a computer, the computer is enabled to perform the data transmission methods performed by the first device in the embodiments in FIG. 2 and FIG. 3. The storage medium may be specifically the foregoing memory 804.

An embodiment of this application further provides a computer program product including an instruction. When the computer program product is run on a computer, the computer is enabled to perform the data transmission method performed by the first device.

An embodiment of this application further provides a network interface processing circuit. The network interface processing circuit includes a processing circuit and a communications interface circuit. The communications interface circuit is configured to perform a data sending and receiving operation, and the processing circuit is configured to perform the data transmission methods in FIG. 2 and FIG. 3. Optionally, the processing circuit may be specifically an ASIC, or may be a FPGA or another programmable logic device, a discrete gate or a transistor logic device, or a discrete hardware component.

An embodiment of this application further provides a network adapter. The network adapter includes a network interface chip, a memory, and a host interface circuit. The memory is configured to store a computer operation instruction, the host interface circuit is configured to connect a host and the network adapter, and the network interface chip is configured to perform the data transmission methods in FIG. 2 and FIG. 3 by invoking the computer operation instruction. Optionally, the memory may be a buffer.

An embodiment of this application further provides a network device. The network device includes a network adapter, a host, and a memory. The network adapter may be the network adapter in the foregoing embodiment, the memory is configured to store a computer operation instruction, the network adapter is configured to receive or send data, and the host is configured to perform the data transmission methods in FIG. 2 and FIG. 3 by invoking the computer operation instruction. Optionally, the network device may be specifically a server.

It may be clearly understood by persons skilled in the art that for convenient and brief description, for a detailed working process of the described system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiments are merely examples. For example, division into the units is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or another form.

The units described as separate parts may or may not be physically separate, and components displayed as units may or may not be physical units. In an embodiment, the components may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, for example, a Universal Serial Bus (USB) flash drive, a removable hard disk, a ROM, a RAM, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A data transmission method, implemented by a first device, wherein the data transmission method comprises:
encapsulating target data into a plurality of remote direct memory access (RDMA) packets according to an RDMA protocol, wherein the target data needs to be written by the first device into a second device for storage, and wherein at least one of the RDMA packets carries a packet sequence number (PSN);
sending the RDMA packets sequentially to the second device according to a PSN sequence of the RDMA packets, wherein each of the RDMA packets carries a data write address of the second device, and wherein the data write address is an address at which each of the RDMA packets is written into the second device to enable the second device to obtain the data write address from each of the RDMA packets and write the target data into storage space corresponding to the data write address;

receiving a retransmission indication packet from the second device when the RDMA packets are not all successfully sent to the second device, wherein the retransmission indication packet carries a retransmission PSN, wherein the retransmission PSN corresponds to a bit comprising a reception status, wherein the reception status indicates a reception failure state in a bitmap table, and wherein each of the RDMA packets comprises the PSN, wherein the PSN in each of the RDMA packets corresponds to a separate bit in the bitmap table; and sending a retransmission packet to the second device, wherein the retransmission packet is an RDMA packet that fails to be received, corresponds to the retransmission PSN, and prompts the second device to store data in the retransmission packet into the second device.

2. The data transmission method of claim 1, wherein each of the RDMA packets carries an RDMA extended transport header, and wherein the RDMA extended transport header indicates the data write address.

3. The data transmission method of claim 1, wherein the retransmission indication packet indicates a plurality of retransmission packets and a PSN of a start retransmission packet.

4. The data transmission method of claim 1, wherein the target data is data stored in memory space of an application program in the first device.

5. The data transmission method of claim 1, wherein the RDMA packets comprise an RDMA write packet.

6. The data transmission method of claim 5, wherein the RDMA write packet comprises an RDMA write middle packet that comprises an RETH field.

7. The data transmission method of claim 5, wherein the RDMA write packet comprises an RDMA write last packet that comprises an RETH field.

8. A data transmission method implemented by a first device, wherein the data transmission method comprises:

sending a data read request to a second device, wherein the data read request is based on a remote direct memory access (RDMA) protocol and carries a data read address and a data write address, wherein the data read address is a destination address of target data in the second device;

reserving the data write address;

reading the target data from the second device to store the target data at the data write address;

receiving a first plurality of RDMA packets sequentially from the second device according to a packet sequence number (PSN) sequence of the first RDMA packets, wherein each of the first RDMA packets carries a PSN, and wherein each of the first RDMA packets comprises the data write address corresponding to data of the packet;

determining another PSN corresponding to another bit comprising a reception status, wherein the reception status indicates a reception failure state in a bitmap of the first device as a retransmission PSN when the second quantity of the second RDMA packets are less than or equal to the first quantity of the first RDMA packets;

sending a retransmission indication packet to the second device, wherein the retransmission indication packet carries the retransmission PSN;

receiving a retransmission packet from the second device based on the retransmission indication packet, wherein the retransmission packet is an RDMA packet that fails to be received and corresponds to the retransmission PSN;

obtaining the data write address of each of a second plurality of RDMA packets when successfully receiving the second RDMA packets, wherein a second quantity of the second RDMA packets are less than or equal to a first quantity of the first RDMA packets; and writing data of each of the second RDMA packets into the data write address corresponding to each of the second RDMA packets.

9. The data transmission method of claim 8, wherein after receiving the first RDMA packets sequentially from the second device according to the PSN sequence of the first RDMA packets, the data transmission method further comprises determining a reception status of each bit in a bitmap table of the first device based on a reception situation of the first RDMA packets, wherein the reception status is a reception success state, and wherein the PSN of each of the first RDMA packets corresponds to a separate bit in the bitmap table.

10. The data transmission method of claim 8, wherein an acknowledgement (ACK) extended transport header field in a negative acknowledgment packet from the RDMA protocol indicates the retransmission PSN.

11. The data transmission method of claim 8, wherein the data read request carries an RDMA extended transport header field that indicates the data write address.

12. The data transmission method of claim 8, wherein after receiving the first RDMA packets sequentially from the second device according to the PSN sequence of the first RDMA packets, the data transmission method further comprises determining a reception status of each bit in a bitmap table of the first device based on a reception situation of the first RDMA packets, wherein the reception status is a reception failure state, and wherein the PSN of each of the first RDMA packets corresponds to a separate bit in the bitmap table.

13. The data transmission method of claim 8, wherein the retransmission indication packet indicates a plurality of retransmission packets and a PSN of a start retransmission packet.

14. A network device, wherein the network device is a first device, wherein the network device comprises:

a processor; and a memory coupled to the processor and storing instructions that, when executed by the processor, cause the network device to be configured to:

encapsulate target data into a plurality of remote direct memory access (RDMA) packets according to an RDMA protocol, wherein the target data needs to be written by the first device into a second device for storage, wherein any one of the RDMA packets carries a packet sequence number (PSN);

send the RDMA packets sequentially to the second device according to a PSN sequence of the RDMA packets, wherein each of the RDMA packets carries a data write address, and wherein the data write address is for writing data in each of the RDMA packets into the second device to enable the second device to obtain the data write address from each of the RDMA packets and write the target data into storage space corresponding to the data write address;

receive a retransmission indication packet from the second device when the RDMA packets are not all successfully sent to the second device, wherein the retransmission indication packet carries a retransmission PSN, wherein the retransmission PSN corresponds to a bit comprising a reception status that is a reception failure state in a bitmap table of the second device, and wherein each of the RDMA packets comprises a PSN that each correspond to a separate bit in the bitmap table; and send a retransmission packet to the second device, wherein the retransmission packet is an RDMA packet that fails to be received, corresponds to the retransmission PSN, and prompts the second device to store data in the retransmission packet into the second device.

15. The network device of claim 14, wherein each of the RDMA packets carries an RDMA extended transport header that indicates the data write address.

16. A network device, wherein the network device is a first device, and wherein the network device comprises:
a processor;
a memory coupled to the processor and storing instructions that, when executed by the processor, cause the network device to be configured to:
send a data read request to a second device, wherein the data read request is based on a remote direct memory access (RDMA) protocol and carries a data read address and a data write address, wherein the data read address is a destination address of target data in the second device;
reserve the data write address;
read the target data from the second device to store the target data at the data write address;
receive a first plurality of RDMA packets sequentially from the second device according to a packet sequence number (PSN) sequence of the first RDMA packets, wherein each of the first RDMA packets carries a PSN, and wherein each of the first RDMA packets comprises the data write address corresponding to data of the packet;

determine another PSN corresponding to another bit comprising a reception status, wherein the reception status indicates a reception failure state in a bitmap of the first device as a retransmission PSN when the second quantity of the second RDMA packets are less than or equal to the first quantity of the first RDMA packets;

send a retransmission indication packet to the second device, wherein the retransmission indication packet carries the retransmission PSN;

receive a retransmission packet from the second device based on the retransmission indication packet, wherein the retransmission packet is an RDMA packet that fails to be received and that corresponds to the retransmission PSN;

obtain the second data write address of each of a second plurality of RDMA packets when successfully receiving the second RDMA packets, wherein a second quantity of the second RDMA packets is less than or equal to a first quantity of the first RDMA packets; and write data of each of the second RDMA packets into the data write address corresponding to each of the second RDMA packets.

17. The network device of claim 16, wherein the instructions further cause the network device to be configured to determine a reception status of each bit in a bitmap table of the first device based on a reception situation of the first RDMA packets, wherein the reception status is a reception success state, and wherein the PSN of each of the first RDMA packets corresponds to a separate bit in the bitmap table.

18. The network device of claim 16, wherein an acknowledgement (ACK) extended transport header field in a negative acknowledgment packet from the RDMA protocol indicates the retransmission PSN.

19. The network device of claim 16, wherein the data read request carries an RDMA extended transport header field that indicates the data write address.

20. The network device of claim 16, wherein the instructions further cause the network device to be configured to determine a reception status of each bit in a bitmap table of the first device based on a reception situation of the first RDMA packets, wherein the reception status is a reception failure state, and wherein the PSN of each of the first RDMA packets corresponds to a separate bit in the bitmap table.

* * * * *